(12) United States Patent
Bacher et al.

(10) Patent No.: US 6,557,926 B1
(45) Date of Patent: May 6, 2003

(54) MOTOR VEHICLE WITH A LOAD-SPACE SECURING ELEMENT

(75) Inventors: Werner Bacher, Sindelfingen (DE); Manfred Deubert, Holzgerlingen (DE); Konrad Eipper, Rottenburg (DE); Zoltan Körmendy, Gärtringen (DE); Klaus Riehle, Gärtringen (DE); Martin Steiner, Grafenau (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/442,607

(22) Filed: Nov. 18, 1999

(30) Foreign Application Priority Data

Nov. 19, 1998 (DE) .......................................... 198 53 361

(51) Int. Cl.$^7$ ................................................. B60P 7/08
(52) U.S. Cl. ................ 296/146.8; 296/24.1; 296/37.16; 410/97; 410/100; 410/117; 410/118; 410/129; 280/749
(58) Field of Search ................................. 410/117, 118, 410/97, 100, 129; 296/24.1, 37.16, 50, 106, 146.8; 280/749

(56) References Cited

U.S. PATENT DOCUMENTS

| | | | | |
|---|---|---|---|---|
| 2,669,402 A | * | 2/1954 | Delmar | ...................... 410/118 |
| 2,827,958 A | * | 3/1958 | Lee | ...................... 410/140 X |
| 3,053,566 A | * | 9/1962 | Allen | |
| 3,486,723 A | * | 12/1969 | Harrison | ...................... 410/118 |
| 4,136,905 A | * | 1/1979 | Morgan | ...................... 296/50 |
| 5,026,231 A | * | 6/1991 | Moore | ...................... 410/118 |
| 5,110,172 A | * | 5/1992 | Ney et al. | ...................... 296/50 |
| 5,271,656 A | * | 12/1993 | Hull et al. | ................ 296/50 X |
| 5,437,474 A | * | 8/1995 | Ament | ...................... 280/749 |
| 5,533,773 A | * | 7/1996 | Lessick | |
| 5,632,520 A | * | 5/1997 | Butz | ...................... 410/118 X |
| 5,820,187 A | * | 10/1998 | Ament et al. | ............... 296/24.1 |
| 5,915,652 A | * | 6/1999 | Caldwell et al. | ......... 410/118 X |
| 6,004,084 A | * | 12/1999 | Moker | ........................ 410/118 |
| 6,007,283 A | * | 12/1999 | Labeur | ........................ 410/97 |
| 6,099,222 A | * | 8/2000 | Moore | ........................ 410/100 |
| 6,155,621 A | * | 12/2000 | Nishida et al. | ............. 296/24.1 |
| 6,183,177 B1 | * | 2/2001 | Dahlgren | ................... 410/100 |

FOREIGN PATENT DOCUMENTS

DE 196 34 104 C1 6/1997

* cited by examiner

Primary Examiner—Stephen T. Gordon
(74) Attorney, Agent, or Firm—Crowell & Moring LLP

(57) ABSTRACT

A flexible planar structure unit is provided as load-space securing element, the unit being arranged extended in a protective position in the vicinity of the moveable rear-section arrangement in such a way that loads which are located in the load space, or at least a person who is located on a seat arrangement facing counter to the direction of travel in the load space is protected with points of attachment to the vehicle bodywork being provided for securing the planar structure unit in the extended protective position.

11 Claims, 3 Drawing Sheets

US 6,557,926 B1

MOTOR VEHICLE WITH A LOAD-SPACE SECURING ELEMENT

CROSS REFERENCE TO RELATED APPLICATION

Priority is claimed with respect to German Application No. 198 53 361.6-22 filed in Germany on Nov. 19, 1998, the disclosure of which is incorporated herein by reference.

BACKGROUND OF THE INVENTION

The invention relates to a motor vehicle with a load-space securing element, the load space being bounded in a rear region by a moveable rear-section arrangement.

Such load-space securing elements are generally known, in particular, for estate cars. The load-space securing element has a separating net which is secured in the vicinity of a back rest of a rear seat bench and can be drawn out of a cassette-type casing into a protective position which vertically separates the rear space from the load space.

A load-space securing element for securing loads in position on a load area of the load-space is also known (DE 196 34 104 C1). The latter has a flexible net which can be stretched over appropriate loads on the load area using lateral extension straps. As a result, the loads are secured in position on the load area, and thus on the floor of the load space.

SUMMARY OF THE INVENTION

The object of the invention is to provide a motor vehicle of the type mentioned at the beginning in which protection of persons located in or around the vehicle is improved.

This object is achieved in that a flexible planar structure unit is provided as load-space securing element, said unit being arranged extended in a protective position in the vicinity of the moveable rear-section arrangement in such a way that loads which are located in the load space, or at least a person who is located on a seat arrangement facing counter to the direction of travel in the load space is protected, points of attachment to the vehicle bodywork being provided for securing the planar structure unit in the extended protective position. Here, the rear-section arrangement may be permanently arranged in the protective position or else arranged so as to be moveable between a home position and the protective position. The planar structure unit can be composed of a single-component planar structure or of a plurality of planar structures. Furthermore, the planar structure unit can extend within the load space directly in front of the rear-section arrangement or outwards over the rear-section arrangement. The planar structure unit can also be extended merely over a rear-window cut-out or else over the entire rear cut-out, closed by the rear-section arrangement, of the bodyshell. In each case, the planar structure unit is positioned fixed to the vehicle in the protective position, in which case it is secured to appropriate, stationary parts of the bodyshell in order to ensure that persons or loads are reliably restrained. By virtue of the fact that the planar structure unit is positioned in the vicinity of the moveable rear-section arrangement, the planar structure unit is located in the direct vicinity of the rear-section arrangement, whether on the outside or the inside. The load-space capacity is thus not adversely affected by the planar structure unit. Load space is understood to be the load space of estate cars, of large-capacity limousines or of commercial vehicles, as well as the boot of a passenger car with a notchback, sloping or steep rear-end.

In a refinement of the invention, the planar structure unit is arranged so as to be moveable between a home position and an extended protective position. In the home position, the flexible planar structure unit is preferably rolled up, collapsed or folded together at a suitable point, positioned fixed to the vehicle at the side, at the top or at the bottom. The planar structure unit can be moved into the protective position manually or by means of a drive. It can also be coupled to the movement of the rear-section arrangement, which can be designed as a single-component tailgate or rear-end door or else as a multicomponent tailgate or rear-end door or as a boot lid.

In a further refinement of the invention, guide means, are provided for the planar structure unit, said means being arranged fixed to the vehicle bodywork in the vicinity of a rear cut-out, closed by the rear-section arrangement, in the bodyshell. As a result, a drawing-out movement and a retraction movement of the planar structure unit between the home position and the protective position are ensured. The guide means may be designed as rails or as rolling sections or sliding sections and are laid along the contour of the rear-section arrangement, at least over part of the height of the rear-section arrangement. A boot lid of a passenger car with notchback rear-end also serves as a rear-section arrangement.

In a further refinement of the invention, deflection means are assigned to the guide means to permit three-dimensional extension in accordance with a contour of the rear-section arrangement. This makes it possible to extend the planar structure unit three-dimensionally in the protective position in a curved or angled fashion. This is advantageous in particular in passenger cars with an angled or curved tailgate or with a boot lid because, despite the corresponding, three-dimensional shaping of the respective rear-section arrangement, the planar structure unit is extended in a space-saving way which does not influence the capacity of the load space.

In a further refinement of the invention, the planar structure unit is designed as a roller blind which can be wound down from a roller shaft, the roller shaft being mounted fixed to the bodywork. This is a particularly simple variant in which the planar structure unit is accommodated in its home position in a particularly space-saving way in the load space.

In a further refinement of the invention, the planar structure unit is dimensioned in such a way that in the protective position it extends over a rear-window region.

In a further refinement of the invention, in the protective position the planar structure unit extends over the entire rear cut-out.

In a further refinement of the invention, the planar structure unit is of at least partially transparent design. This refinement ensures that in its protective position the planar structure unit does not adversely affect the driver's visibility to the rear.

BRIEF DESCRIPTION OF THE DRAWINGS

Further advantages and features of the invention emerge from the subclaims and from the following description of preferred exemplary embodiments of the invention which are represented with reference to the drawings.

DETAILED DESCRIPTION OF THE PREFERRED EMBODIMENT

Figure 1:
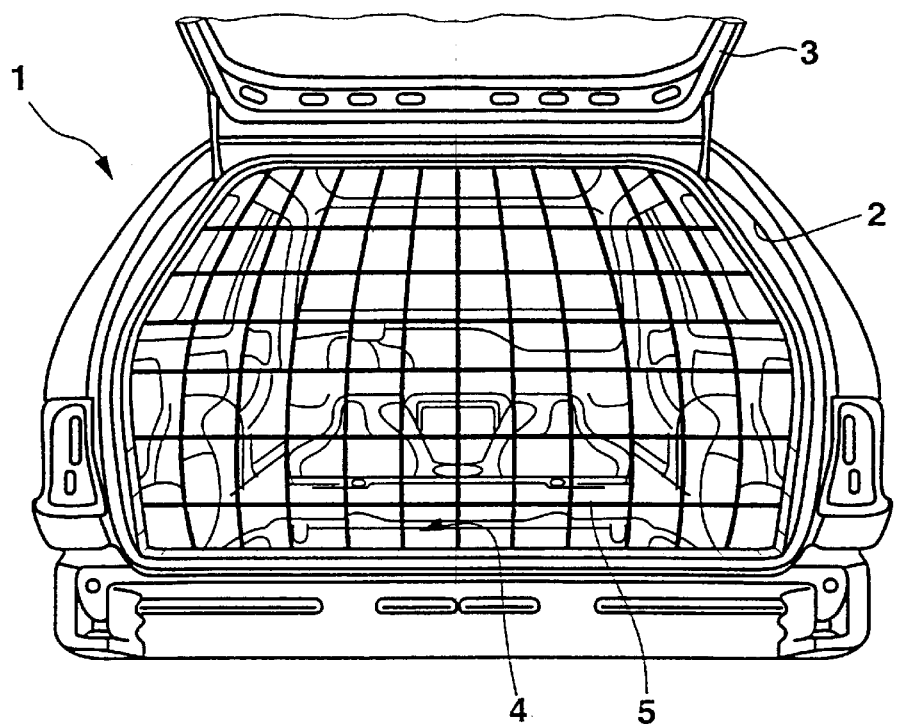
FIG. 1 shows, in a rear view, an embodiment of a motor vehicle according to the invention with the tailgate open, a load-space securing element being located in a protective position.
Figure 2:
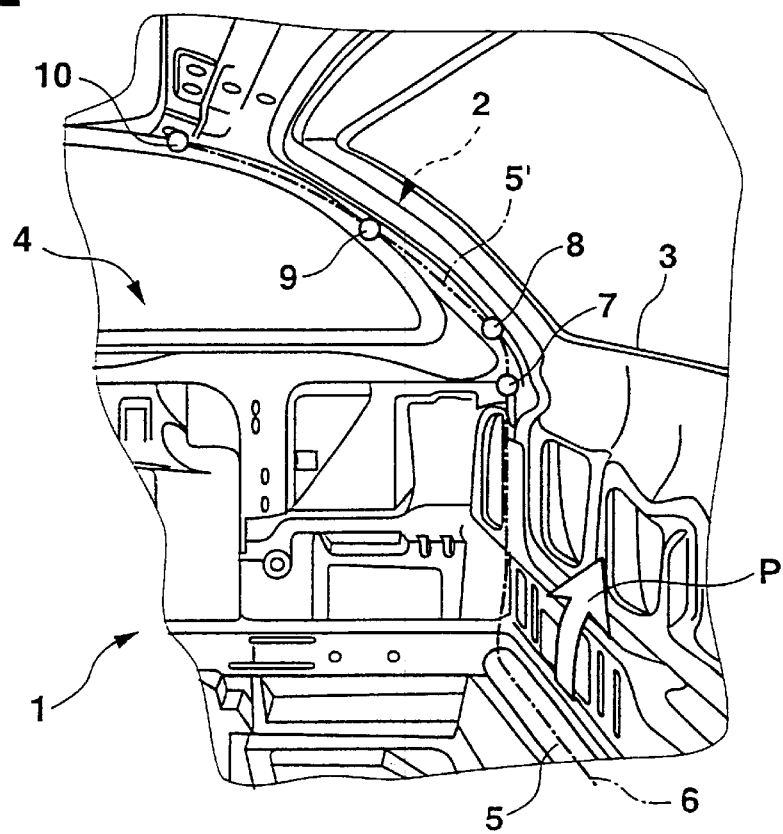
FIG. 2 shows a perspective view of a detail of the bodyshell of the motor vehicle according to FIG. 1, viewed from the interior obliquely onto the tailgate, the load-space securing element according to FIG. 1 being located in its home position.

An estate car 1 according to FIGS. 1 and 2, which is illustrated with its self-supporting bodyshell, has, in a basically known manner, a rear cut-out 2 which is bounded by respective supporting structure components of the bodyshell. In order to close the rear cut-out 2, a tailgate 3 is provided which is coupled in a swivelling fashion to the bodyshell at a roof-end section of the rear cut-out 2. The rear cut-out 2, and thus the tailgate 3 which serves as a rear-section arrangement form, in the rear part of the estate car 1, a rear-end boundary of a load space 4 which extends, in a basically known manner, between a front row seat or a rear seat bench and a rear cut-out 2. In the vicinity of a back rest of the rear seat bench, a separating net which serves as a load-space partition which separates the load space from a passenger compartment can be retracted into and drawn out of an appropriate cassette-type casing.

In the rear region of the load space 4, a load-space securing element is provided in the form of a securing net 5 which serves as a flexible planar structure unit and extends, in its protective position according to FIG. 1, over the entire height and entire width of the rear cut-out 2.

As is clear from FIG. 2, in its unused home position, the securing net 5 is wound onto a roller shaft which is rotationally mounted in the transverse direction of the vehicle in an appropriate depression in the floor of the load space on appropriate supporting structure components of the bodyshell. A retaining spring arrangement, which holds the securing net 5 in the wound-up home position and additionally retracts the securing net 5 into the home position according to FIG. 2 after it has been released from the appropriate protective position according to FIG. 1 is assigned (in a way which is not illustrated in more detail) to the roller shaft which can rotate about the axis of rotation 6.

The points of attachment 7 to 10 are arranged distributed on opposite sides of the rear cut-out 2 as hooks or eyelets on the bodyshell, in each case at the same height and over the entire length of the protectively positioned securing net 5'. The positioning of the points of attachment 7 to 10 to the bodyshell is matched here to the curved contour of the tailgate 3. A lower point of attachment 7 on each side of the rear cut-out 2 is located just below a sill line of the bodyshell. The subsequent point of attachment 8 on each side is located just above the sill line. The two points of attachment 9 are located at the window height and the two points of attachment 10 are arranged in the roof region of the estate car 1, and thus of the bodyshell. The two upper points of attachment 10 may be designed as catches for the engagement of a rigid drawing-out bar which is part of the securing net and forms an end termination of the securing net. By means of this drawing-out bar, the securing net 5 can also easily be pulled out manually in an upward direction. The drawing-out of the securing net 5 in an upward direction takes place in the direction of the arrow P. Here, the drawing-out bar of the securing net 5 is initially engaged in the upper points of attachment 10, and the side edges of the securing net are then secured to the appropriate points of attachment 7, 8, 9 by means of corresponding hooks, eyelets or suitable cut-outs by means of engagement. The attachment locations in the vicinity of the points of attachment 7 to 10 are of stable configuration such that the securing net 5 remains in its protective position according to FIG. 1 even in the event of high tensile stresses owing to a person impacting against the net or owing to a load impacting against the securing net 5.

In a similar exemplary embodiment of the invention, instead of the points of attachment 7 to 9, guiding and deflection rollers, by means of which appropriately reinforced side edges of the securing net are guided and deflected, are provided at the same height. In this exemplary embodiment, the deflection and guidance takes place precisely along the later contour of the securing net 5 even during the drawing-out process by virtue of the fact that the securing net is guided over the individual guiding and deflection rollers as it is drawn out. Both in this exemplary embodiment and in the exemplary embodiment described according to FIGS. 1 and 2, the rear end of the securing net 5 which remains on the roller shaft is anchored securely to the roller shaft in such a way that it remains in position fixed to the bodywork in all cases. Of course, the roller shaft is also securely mounted in the bodywork in such a way that under appropriate loading it cannot be torn out of its mount. Instead of a simple roller shaft, it is also possible to accommodate the securing net, including an appropriate roller shaft, in a cassette-type casing which can be countersunk in its entirety in the floor of the load space. The term roller shaft is to be understood as a simple, rotatably mounted shaft which has means for securing the end of the securing net. Instead of guiding and deflection rollers, guiding and/or deflection rails or guiding and/or deflection means of some other design may also be provided.

Figure 3:
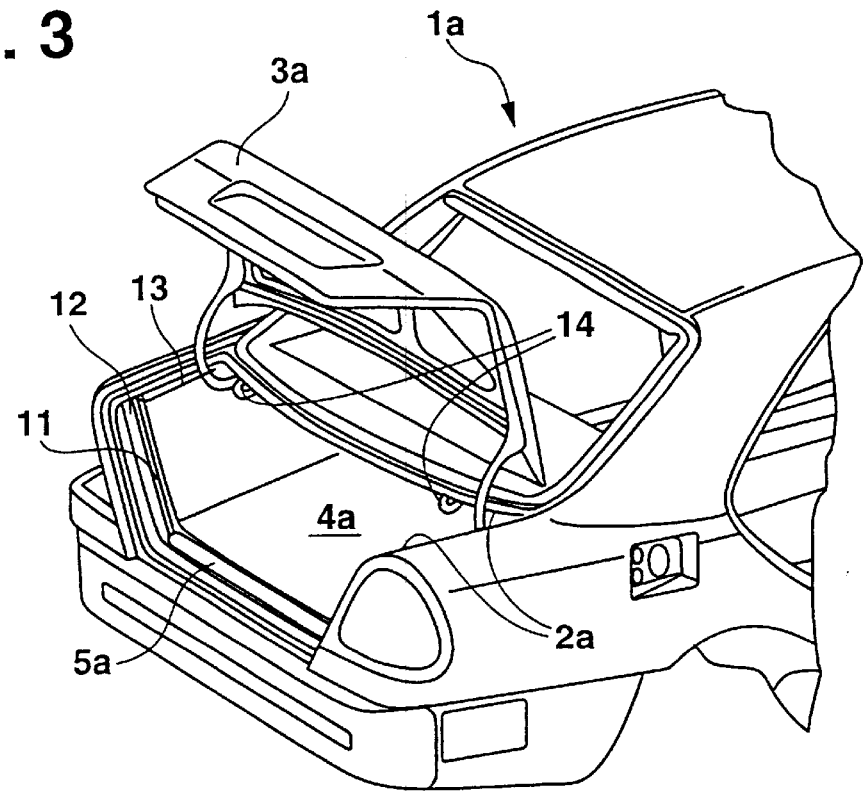
FIG. 3 shows a further embodiment of a motor vehicle according to the invention in the form of a passenger car with a notchback rear-end with the boot lid open, a load-space securing element of the boot being located in its home position.
Figure 4:
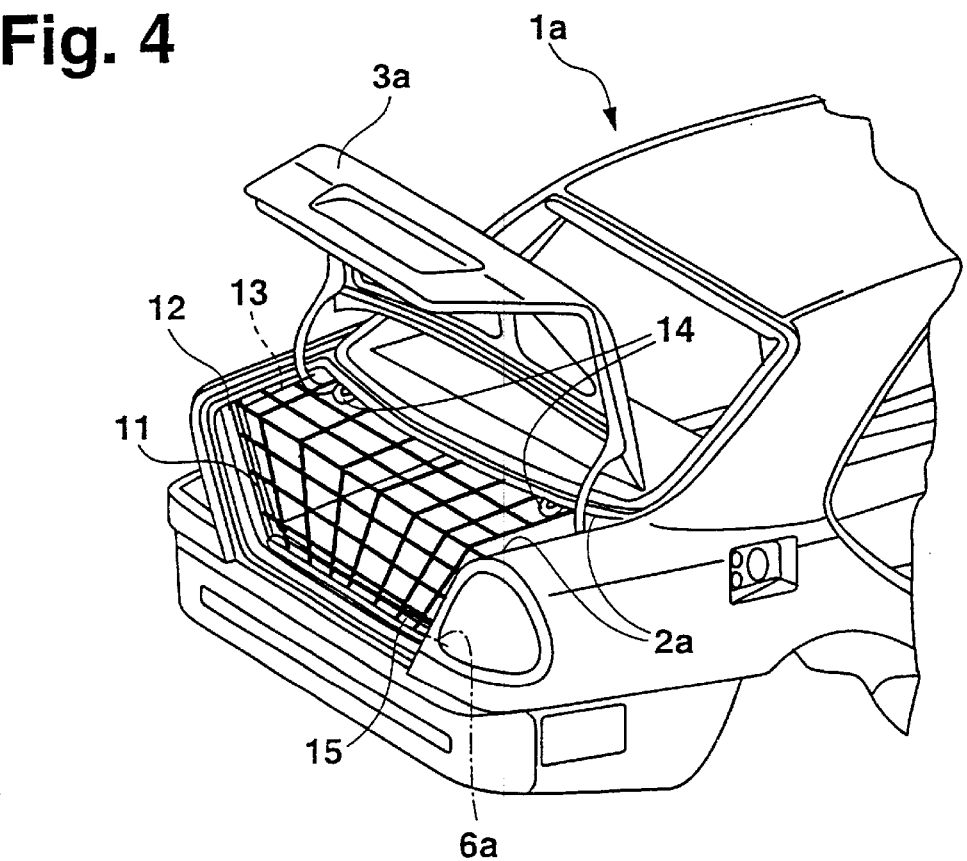
FIG. 4 shows the motor vehicle according to FIG. 3 with the boot lid open, the load-space securing element being located in its protective position.

A passenger car 1a according to FIGS. 3 and 4 is designed as a notchback limousine and has, as load space, a boot 4a which can be closed by a boot lid 3a which serves as rear-section arrangement. The boot lid 3a has a contour which is angled at an approximate right angle. In the vicinity of the boot 4a and thus in the rear region of the motor vehicle 1a, the bodyshell has a rear cut-out 2a which is shaped to match the peripheral edge of the boot lid 3a and thus also has a contour which is offset at an approximate right angle. The rear cut-out 2a of the bodyshell begins at the rear with a vertically bounded planar section and is continuous with a horizontally bounded planar section in the vicinity of its upper side.

A flexible planar structure unit in the form of a securing net 5a, which is arranged wound onto a roller shaft 15 in its home position (FIG. 3) in the vicinity of a lower edge of the rear cut-out 2a, is assigned to the boot 4a as a boot securing element. According to FIG. 4, the roller shaft 15 is mounted on the bodyshell so as to be capable of rotating about a horizontal axis of rotation 6a which runs in the transverse direction of the vehicle. In order to guide the securing net 5a out of its home position into its protective position according to FIG. 4, guiding rails 11 are attached to the ends of the roller shaft 15 which lie opposite one another, in which rails 11 the side edges of the securing net 5a which lie opposite one another are guided in a vertically upwards during a drawing-out movement. The guiding rails 11 are open at their upper end and each have a deflection guide 12 which serves as deflection means, by means of which guide 12 the securing net can be drawn out further in a forward horizontal direction in the longitudinal direction of the vehicle. Further guide means in the form of horizontally extending guiding rails which are secured in the vicinity of the rear cut-out 2a may be assigned to this horizontally extending section of the securing net. Instead of such guiding rails 13, other supporting or guiding means can also be arranged fixed to the bodywork on opposite sides of the horizontal region of the rear cut-out 2a. In the drawn-out protective position, the front end of the securing net can be engaged in a stable fashion on points of attachment 14 which are secured to the bodyshell and which may be embodied as hooks or eyelets. In this way, in its protective position, the securing network 5a spans the entire contour of the rear cut-out 2a.

Figure 5:
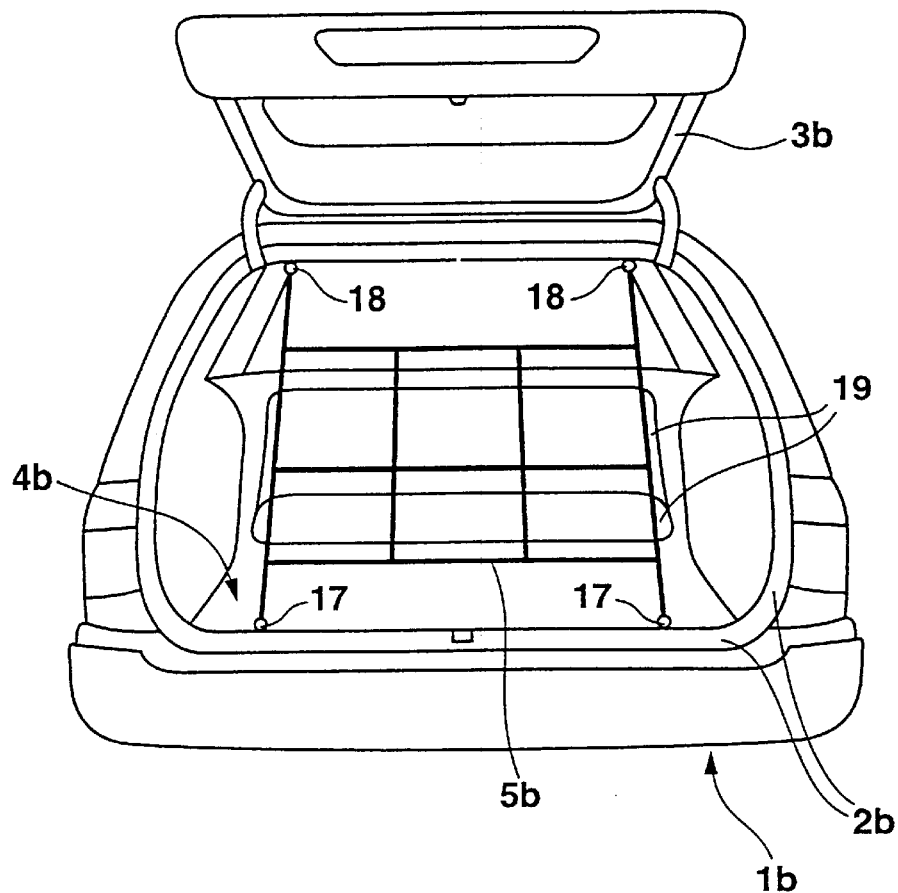
FIG. 5 shows a rear view of an estate car according to FIG. 1 which is provided with a modified load-space securing element.

An estate car 1b having a tailgate 3b according to FIG. 5 is provided, in a load space 4b, with an additional seat bench 19 which faces counter to the normal direction of travel and on which preferably one or two persons can be seated facing counter to the direction of travel. A flexible planar structure 5b is extended tautly in its protective position in the rear region, said structure 5b extending over the entire height of the rear cut-out 2b. The planar structure 5b is secured tautly extended in the vicinity of a lower edge of the rear cut-out 2b to the points of attachment 17 which are fixed to the bodywork, and to two further points of attachment 18 which are fixed to the bodywork in the vicinity of an upper edge of the rear cut-out 2b and thus in a roof region. The planar structure 5b can be formed by means of stable textile belts which are laid one on top of the other in the transverse and vertical direction in the manner of a net in accordance with FIG. 5. The planar structure 5b also has two lateral edge straps which are secured to the two points of attachment 17, 18 by means of corresponding attachment elements. As is clear from FIG. 5, the planar structure 5b extends in a plane between the points of attachment 17 and 18 and is thus not guided so that it matches the curved contour of the rear cut-out 2b. Nevertheless, the planar structure 5b is arranged at a large distance behind the seat bench 19 in the rear region of the estate car 1b such that the seated position of the persons located on the seat bench 19 is not adversely affected. There is a free space remaining between the lateral edge straps of the planar structure 5b and the side edges of the rear cut-out 2b, said space being, however, dimensioned in such a way that a person cannot pass through it. The planar structure 5b serves not only as a restraint for loads but also merely as a restraint for persons who are located on the seat bench 19, as well as possibly alternatively or additionally as a restraint for large and bulky loads.

Figure 6:
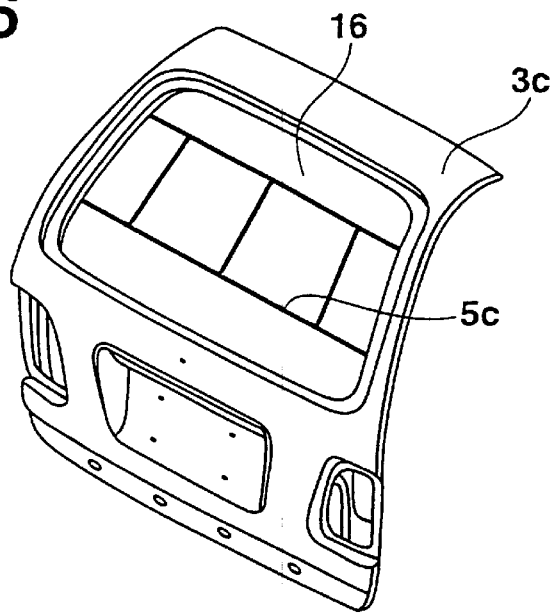
FIG. 6 shows the extension of a further load-space securing element transversely over a rear window of a tailgate of an estate car according to FIG. 1 or 5.

A load-space securing means is provided for just one window cut-out of the rear window 16. This load-space securing means is provided by a flexible planar structure 5c which is made up of two transverse straps which run in the transverse direction of the vehicle and extend over the entire width of the rear window 16, as well as connecting strap sections which extend between the said transverse straps in the manner of the crossbars of a ladder. The planar structure 5c is secured to an inner side of bodyshell sections of the tailgate 3c by means of appropriate points of attachment. Alternatively, the planar structure 5c can also be secured to appropriate points of attachment of the stationary rear cut-out on the bodyshell. The planar structure 5c which is illustrated in FIG. 6 is also designed with large meshes such that it principally serves as a restraint for persons who are positioned on a third seat bench facing counter to the direction of travel in the load space of the estate car.

Instead of nets with large meshes, other textile materials or plastic films which must each have the appropriately required, high tear strength, may also be used as the planar structure.

What is claimed is:

1. A motor vehicle, comprising:
   a passenger vehicle bodyshell defining a load space and a rear cut-out region which is closeable by a movable rear section to enclose the load space;
   a load space securing element which is separate from the moveable rear section, comprising a flexible planar structure having a periphery, wherein in a protective position, an entirety of the periphery is arranged along a contour of the rear cut-out region; and
   a plurality of points of attachment being arranged on the bodyshell for attaching a portion of the periphery of the flexible planar structure to the contour of the rear cut-out region;
   whereby loads located in the load space, or a person located on a seat arrangement facing counter to a direction of travel in the load space are protected by the load space securing element, and
   wherein lower ones of the points of attachment are arranged on each side of the rear cut-out region below a sill line of the body shell, subsequent ones of the points of attachment are arranged on each side of the rear cut-out region just above the sill line, further subsequent ones of the points of attachment are arranged on each side of the rear cut-out region at a window height, and upper ones of the points of attachment are arranged in a roof region of the bodyshell.

2. The motor vehicle according to claim 1, wherein the flexible planar structure extends over the entire rear cut-out region in the protective position.

3. The motor vehicle according to claim 1, wherein the flexible planar structure is at least partially transparent.

4. The motor vehicle according to claim 1, wherein the load space is arranged in one of a station wagon, notchback vehicle and a sloping or steep rear-end vehicle.

5. The motor vehicle according to claim 1, wherein the flexible planar structure is dimensioned in such a way that in the protective position it extends over a rear-window region.

6. The motor vehicle according to claim 1, wherein the flexible planar structure is moveable between the protective position in which it is retracted, and an unretracted home position.

7. The motor vehicle according to claim 6, wherein the flexible planar structure is moveable manually or by a drive mechanism.

8. The motor vehicle according to claim 6, wherein the flexible planar structure is guided by a guide mechanism arranged on the bodyshell.

9. The motor vehicle according to claim 8, wherein a deflection mechanism is assigned to the guide mechanism to permit three-dimensional extension in accordance with the contour of the rear cut-out region.

10. The motor vehicle according to claim 8, wherein the guide mechanism comprises one of rails, rolling sections and sliding sections.

11. The motor vehicle according to claim 8, wherein the plurality of points of attachment comprise one of hooks and eyelets.

* * * * *